Inventors
George H. Studtmann
Roger W. Burtness

By James J. Jenninger Jr.
Attorney

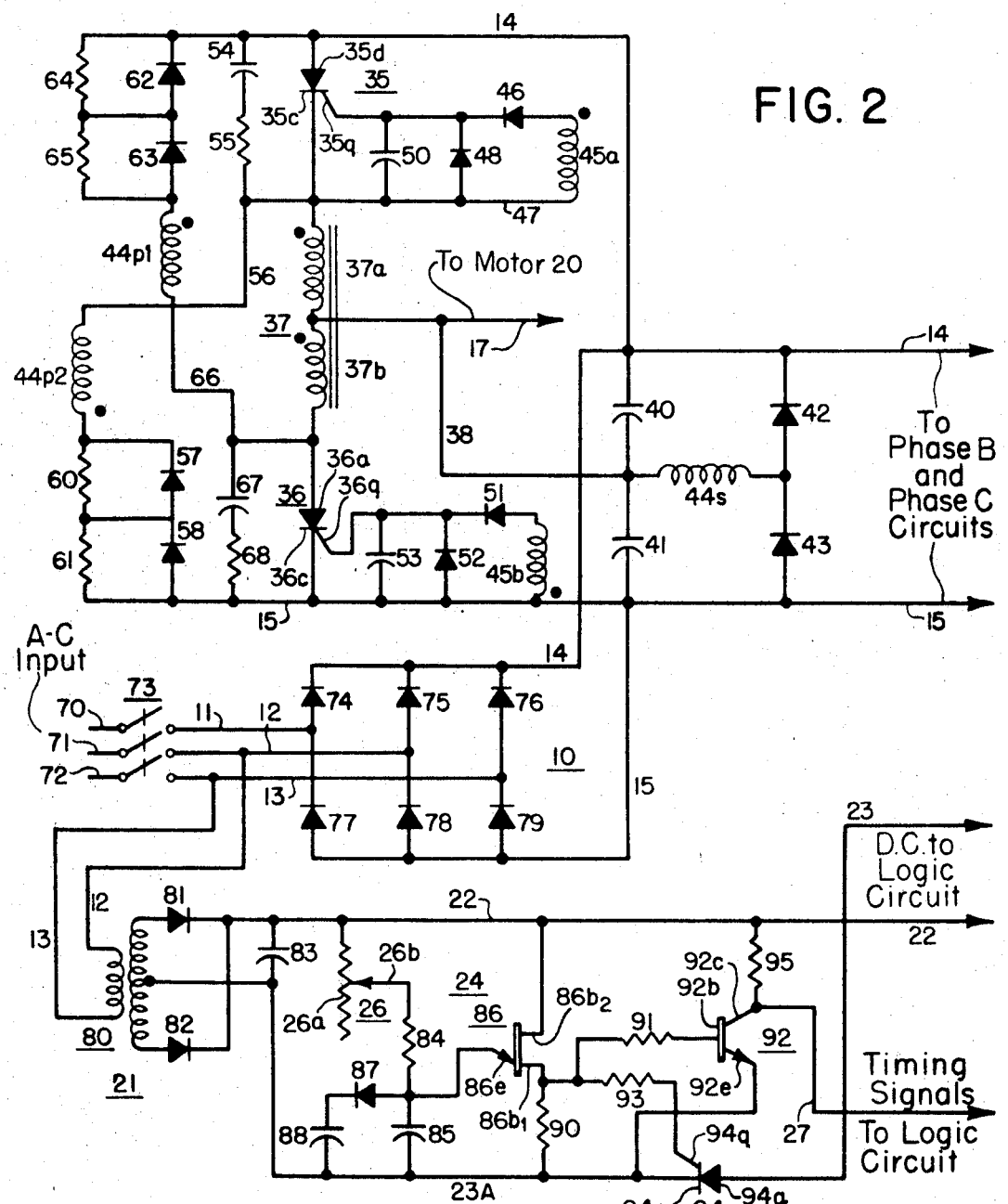

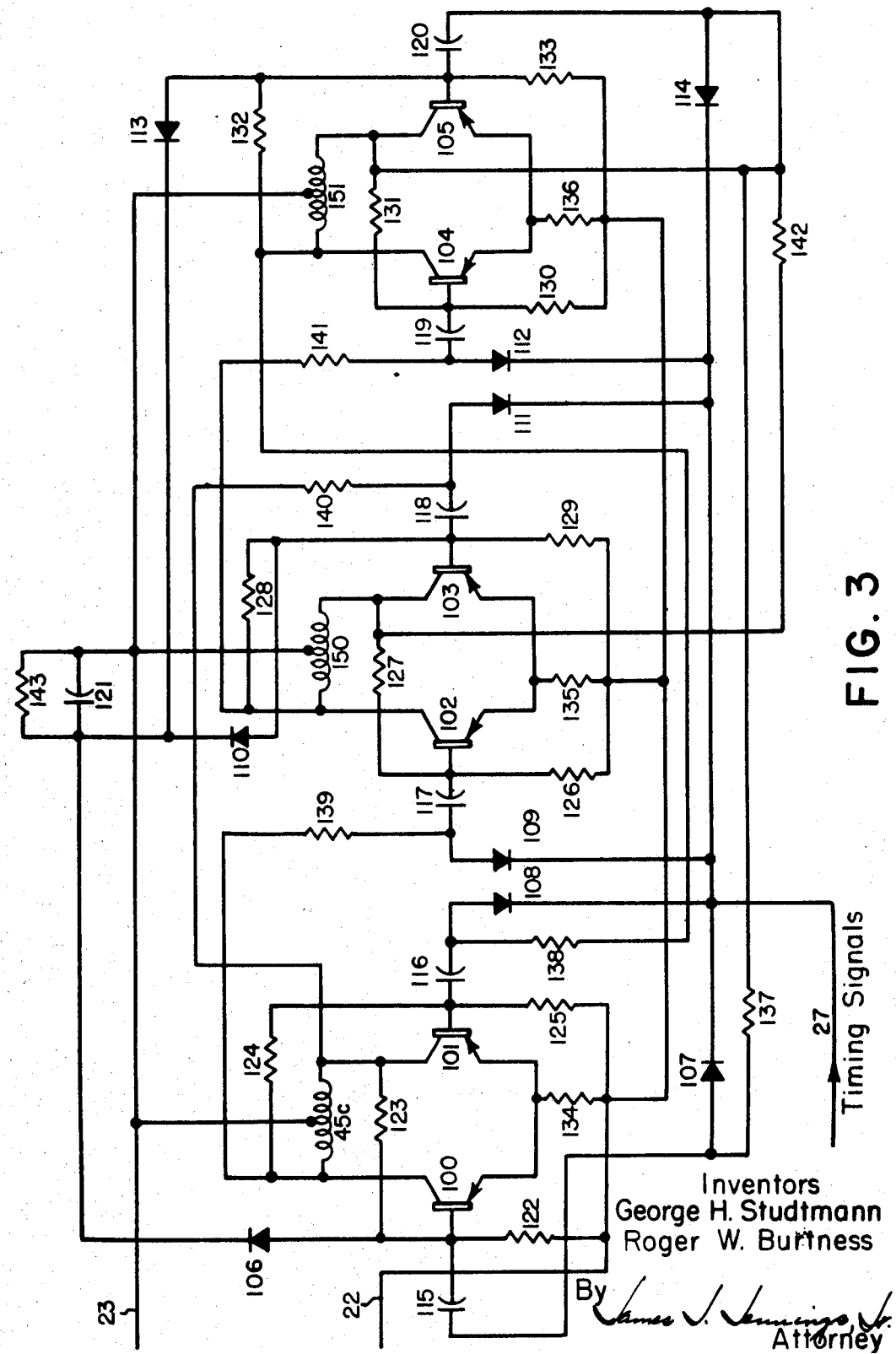

United States Patent Office 3,467,904
Patented Sept. 16, 1969

3,467,904
SPEED CONTROL SYSTEM UTILIZING CONSTANT-AMPLITUDE VOLTAGE OF VARIABLE FREQUENCY TO ENERGIZE AN ELECTRIC MOTOR
George Henry Studtmann, Mount Prospect, and Roger W. Burtness, Urbana, Ill., assignors to Borg-Warner Corporation, Chicago, Ill., a corporation of Illinois
Continuation-in-part of application Ser. No. 519,141, Jan. 6, 1966. This application June 22, 1967, Ser. No. 648,160
Int. Cl. H02p 1/28, 1/42, 3/18
U.S. Cl. 318—230                                     6 Claims

ABSTRACT OF THE DISCLOSURE

A-C energy is rectified to provide a constant voltage D-C energization of a static inverter, and an electrical motor is coupled to the static inverter so that the motor speed is a function of the frequency of the A-C voltage received from the inverter. An oscillator regulates the sequential operation of a logic circuit which in turn controls the frequency of the output voltage passed from the inverter to the motor. Only the frequency, and not the amplitude, of the voltage passed to the motor is regulated so that the motor makes available a constant mechnical power output at a speed determined by the operating frequency of the oscillator circuit.

---

This application is a continuation-in-part of an earlier copending application having Ser. No. 519,141, filed Jan. 6, 1966, with the same title, now abandoned, which was a continuation of an earlier application having Ser. No. 266,334, filed Mar. 19, 1963 (now abandoned), also with the same title, both of which were assigned to the assignee of this invention.

Background of the invention

In electrical systems for energizing and controlling A-C induction motors it has been conventional practice to maintain a constant amplitude/frequency ratio in the A-C voltage applied to the motor. This principle, generally termed "constant volts-per-cycle operation," has become so ingrained that it is virtually automatic to provide such regulation of the amplitude and frequency of the A-C voltage to maintain the constant ratio, without any consideration of the actual demands required by different loads which may be imposed on the output side of the motor, and without considering other components of the control system.

This invention includes the appreciation of the economies attendant upon operating an A-C induction motor by varying only the frequency of the A-C voltage passed to the motor while maintaining constant the amplitude of the voltage passed to the motor. Prior to this invention those skilled in this art universally assumed that if the frequency were changed the amplitude of the A-C voltage must be changed in a corresponding ratio to maintain a constant volts-per-cycle ratio. The state of the art at the time the present invention was made shows conclusively the lack of analysis or consideration of the motor and the other system components (inverter, rectifier, frequency control, etc.) as a unitary system which might impose demands on the system output shaft which did not necessitate variation of the A-C voltage as a function of the frequency changes.

In the face of the long held and always adhered to precepts, the operation of an induction motor in a system where motor speed is regulated by varying only the frequency of the supplied energy while maintaining the voltage constant is not only unobvious, it is a direct contravention of the unequivocal teaching of those skilled in this art. Notwithstanding that substantial economies in the electrical and physical construction of the speed control system, as will be described hereinafter, are realized by practicing the present invention it has never been done nor ever suggested by any single reference or reasonable combination of teachings in this now well developed field.

Summary of the invention

The present invention comprises a speed control system for operating an electric motor over a desired speed range. The motor is energized at a constant electrical voltage input level to make available a constant mechanical power output. The speed control system comprises an input circuit, such as a pair of conductors, over which D-C energy at a constant voltage is received. The D-C energy may be supplied by a rectifier coupled to an A-C supply line, or a battery, or fuel cell, or other suitable means for providing D-C energy at a constant voltage level. An inverter is coupled between such input circuit and the motor to provide A-C energy at the same constant voltage level to energize the motor. A logic circuit may be coupled to the inverter for regulating the switching cycle of the inverter as a function of timing signals received from a frequency control circuit. Accordingly, the frequency control circuit determines the operation of the logic circuit which in turn regulates the frequency of the A-C voltage produced by the inverter, thus to regulate the motor speed.

The drawings

In the several figures of the drawings like reference numerals identify like elements, and in the drawings:

FIGURES 2 and 3 are schematic diagrams depicting circuit details of components shown more generally in FIGURE 1.

Figure 1:
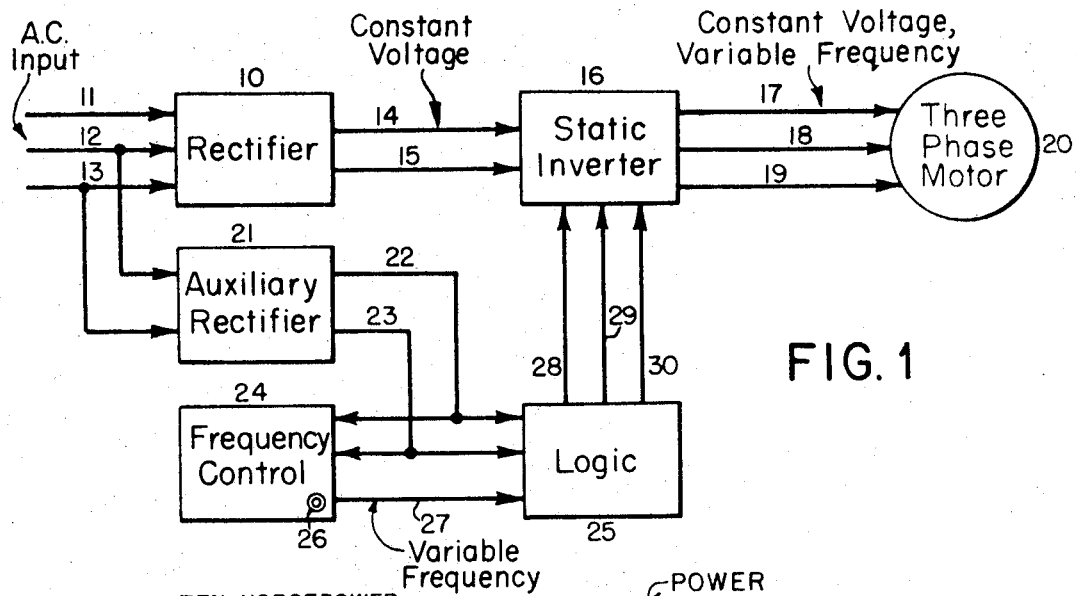
FIGURE 1 is a block diagram illustrating a preferred embodiment of a speed control system of the present invention.

System Block Diagram.—FIGURE 1

Salient components of the invention include a rectifier 10 for receiving A-C in put energy over conductors 11, 12 and 13 and passing D-C energy at a constant voltage level over conductors 14, 15 to static inverter 16. Conductors 14, 15 are actually the input circuit over which the constant-voltage D-C energy is provided, in that a battery, fuel cell, or other suitable source of unidirectional energy at a constant voltage may be substituted for rectifier 10. Inverter 16 provides alternatiing energy at the same constant voltage level and passes this A-C energy over conductors 17, 18 and 19 to energize three phase motor 20. Those skilled in the art will recognize that the principles and teachings of the present invention are equally applicable to a single-phase system but a three phase arrangement is depicted for purposes of illustration and explanation.

Input conductors 12, 13 also pass the A-C input energy to an auxiliary rectifier 21 which in turn provides D-C energy over conductors 22, 23 to frequency control circuit 24 and logic circuit 25. Of course unidirectional energy could be derived from rectifier 10 but those skilled in the art likewise appreciate that for many reasons it is useful to isolate the vairous circuitry to avoid interaction between the system components. Frequency control unit 24 includes an adjusting knob 26 operable to change the frequency of timing pulses produced in this unit and passed over conductor 27 to regulate the operation of logic circuit 25. The logic circuit may be well known arrangement, such as a ring counter, which provides output control pulses over conductors 28, 29 and 30 to static inverter 16 to control the frequency of switching of the components in the inverter in timed relation with the frequency of the timing signals received over conductor 27 from frequency control unit 24. In many publications and patents the logic arrangement may be grouped within the same "box" or general showing as the static inverter, with these two circuit portions treated as a unitary whole, but for purposes of providing a complete and explicit teaching of the present invention the units are depicted separately in the system illustration.

It is emphasized that the system arrangement of FIGURE 1 differs from all the teachings and suggestions of the known art by providing a constant voltage at the input circuit 14, 15 to energize the static inverter which in turn, by reason of the well known operation of such invertrs, provides an output A-C signal at the same constant voltage level. By regulating the frequency of this signal through frequency control unit 24 and logic circuit 25, A-C energy at a constant voltage level but at a variable frequency is passed to the motor 20 to correspondingly regulate motor speed.

Detailed description of the invention

The schematic diagram of FIGURE 2 shows one phase circuit, phase A, of static inverter 16, and the identical circuits for the additional phases B and C can readily be constructed and operated from this showing in that they are identical in all respects. Main rectifier 10 is shown below the inverter phase circuit A, and the auxiliary rectifier 21 and frequency control circuit 24 are depicted in the lower portion of FIGURE 2. A delay circuit is incorporated with the frequency control arrangement to obviate operation of the logic circuit (FIG. 3) before the first timing pulse is generated, and this delay arrangement will be explained below.

The inverter phase A circuit coupled between conductors 15 and 15 includes two semiconductor switches 35, 36 each of which has an anode referenced $a$, a cathode referenced $c$ and a gate or input element referenced $g$. Coupled between these switches, which may be silicon-controlled rectifiers, is a commutating choke assembly 37 including an upper winding 37a and a lower winding 37b. The output conductor 17 from the phase A circuit is coupled to the midpoint of commutating choke 37, and the same connection is extended over conductor 38 to the midpoint between commutating capacitors 40 and 41. A pair of energy return diodes 42, 43 are connected between conductors 14, 15 and a secondary winding 44s of an energy return transformer has one end coupled to the common connection between capacitors 40, 41 and the other end coupled to the common connection between diodes 42, 43. This energy return transformer also inclues a first primary winding 44p1 and a second primary winding 44p2, magnetically coupled to secondary winding 44s.

Gating or turn-on signals are received by SCR 35 over a winding 45a and translated over diode 46 and conductor 47, and applied between the gate and cathode of SCR 35. Protective diode 48 and a capacitor 50 are also coupled between this same gate and cathode as shown. For regulating operation of SCR 36 switching signals received over winding 45b are passed through diode 51 over conductor 15 and applied between the gate and cathode of SCR 36. Another protective diode 52 and a capacitor 53 are coupled between the gate and cathode of SCR 36. The receipt of gating signals by windings 45a, 45b, from primary winding 45c (FIG. 3) will be understood by reference to the logic circuit hereinafter.

A transient suppression circuit including a series connected capacitor 54 and a resistor 55 is coupled between conductor 14 and the bottom common connection between cathode 35c and choke winding 37a. This same common connection is also extended over conductor 56 to the top of primary winding 44p2, the lower portion of which is coupled through a pair of series connected diodes 57, 58 to conductor 15. A pair of series-connected resistors 60, 61 are coupled in parallel with diodes 57, 58 and the common junction between resistors 60 and 61 is electrically connected to the midpoint between diodes 57, 58. Those skilled in the art will appreciate that this network comprising diodes 57, 57 and resistors 60, 61 can be replaced by a single diode, but the indicated arrangement is utilized for reasons of economy. The same is true for the network including diodes 62, 63 and resistors 64, 65, shown coupled between conductor 14 and the upper portion of primary winding 44p1. The lower portion of the same primary winding is coupled over a conductor 66 to the common connection between choke winding 37b and anode 36a. Another series connected transient suppression circuit including a capacitor 67 and resistor 68 is connected between conductors 66 and 15.

Briefly considering the operation of the phase A circuit, it is initially assumed that SCR 35 is conducting and SCR 36 is turned off. Under these conditions commutating capacitor 41 has been charged to the supply voltage over a path extending from conductor 14 over SCR 35, choke winding 37a, conductor 38 and conductor 15. Capacitor 40 has been discharged to essentially zero voltage under these conditions. Load current flows from conductor 14 through SCR 35, winding 37a and conductor 17 to motor 20. Upon receipt of the next switching pulse over winding 45b, SCR 36 is gated on which applies the capacitor 41 voltage across inductor 37b. The magnetic coupling between choke windings 37a and 37b causes an equal voltage to be induced in winding 37a. The voltage across winding 37a reverse-biases SCR 35, turning this SCR off. Capacitor 41 subsequently discharges towards zero and capacitor 40 charges toward the supply voltage. The load current flowing in winding 37a prior to the turning off of SCR 35 is transferred magnetically to winding 37b.

The charge and discharge of capacitors 40 and 41 causes the current in winding 37b to increase beyond the transferred load current. The current in winding 37b finally reaches a peak and starts to decay. Concomitant with the decay of current the polarity of the voltage across windings 37a and 37b reverses, and at a predetermined level diodes 57 and 58 conduct and the trapped energy spills over into transformer 44. This operation obviates semiconductor heating which would otherwise be occasioned as the commutating energy recirculates through the loop including SCR 36 and diode 43. A further and more detailed exposition of this inverter circuit is set out in the copending application of George H. Studtmann having Ser. No. 431,825, filed Feb. 11, 1965, entitled Static Inverter System and assigned to the assignee of this invention. Reference is particularly made to FIGURE 7 of that application and the related explanation for an understanding of the recovery of the commutating energy.

It must again be emphasized that novelty is not predicated upon the particular inverter circuit. Other inverter circuits can be utilized, even lifted out of well known publications such as the Silicon Controlled Rectifier Manual of General Electric Company. The present circuit is only described and illustrated to provide a full, complete teaching of the invention and expound the best mode now known for practicing the invention.

Considering now rectifier circuit 10 in FIGURE 2, A-C input energy is received over supply conductors 70, 71 and 72 and, when on-off switch 73 is closed the A-C energy is passed to the illustrated connections in the rectifier bridge 10 which includes six diodes 74–79 connected in a well known configuration to provide a D-C output voltage on conductors 14 and 15. It is understood that the A-C input energy like any conventional supply from a public utility is at a constant voltage level and therefore a correspondingly constant D-C voltage level is provided over the input circuit including conductors 14, 15 to energize the inverter. This point is reiterated to again emphasize the physical distinctions between the inventive combination and the otherwise universally accepted teachings in this field.

With three phase A-C input voltage on conductors 11–13, some of this energy passes over conductors 12 and 13 to the input transformer 80 of auxiliary rectifier circuit 21. The end portions of the secondary winding of transformer 80 are coupled through diodes 81, 82 to conductor 22. The center tap connection of this secondary winding is coupled to conductor 23A and a filter capacitor 83 is coupled between conductors 22 and 23A.

The frequency control adjustment 26 shown as a knob in FIGURE 1 is depicted as a potentiometer in FIGURE 2 having a resistive element 26a and a movable arm or tap 26b. A series circuit including this potentiometer 26, a resistor 84 and a capacitor 85 is coupled between conductors 22, 23A to provide a variable rate charging circuit for regulating the frequency of operation of a unijunction transistor 86, and thus determining the frequency of the timing pulses passed over conductor 27 to the logic circuit.

Emitter 86e of the unijunction transistor is coupled to the common connection between resistor 84 and capacitor 85. From this same common connection a diode 87 and a capacitor 88 are coupled in a series circuit to conductor 23A. The base two $86b_2$ of transistor 86 is connected to conductor 22 and the base one $86b_1$ is coupled through a resistor 90 to conductor 23a. The base one connection is also coupled through a first resistor 91 to the base 92b of an amplifier transistor 92, and also through a second resistor 93 to the gate 94g of an SCR 94. The cathode 94c of this SCR is connected to conductor 23A, and its anode 94a is connected to conductor 23. Emitter 92e of transistor 92 is coupled to conductor 23A, and its collector 92c is coupled both to the output timing signal conductor 27 and through a resistor 95 to conductor 22.

When the system is energized with 220 volt, 60 hertz, three-phase A-C voltage over conductors 11–13, the single phase of this voltage applied over transformer 80 is rectified in auxiliary rectifier circuit 21 and a D-C potential of approximately 15 volts is established across capacitor 83. Identification and typical values of the circuit components will be set out at the end of the specification. For the present it is sufficient to note that diode 87 and capacitor 88, with SCR 94, cooperate in a delay circuit to insure that the logic circuit 25 does not start spuriously by being energized over conductors 22, 23 before timing pulses are being generated in circuit 24 and passed over conductor 27 to the logic circuit. In effect capacitor 88 in its charging delays generation of the first oscillator pulse until the appropriate D-C energizing potential is present between conductors 22 and 23A. As this first pulse is generated it is passed over resistor 93 and switches on SCR 94 to complete the path of energization (over conductors 22, 23) to the logic circuit.

Details of the logic circuit are set out in FIGURE 3. Interconnection of this circuit to receive energy over conductors 22, 23 from the auxiliary power supply is shown, together with receipt of timing signals over conductors 27. Output timing signals will be provided to the various phase circuits from the primary windings respectively identified by the numerals 45c, 150 and 151. That is the primary winding 45c, shown above transistors 100 and 101, is magnetically coupled to the secondary windings 45a, 45b in FIGURE 2 to provide the appropriate gating signals to the SCR's 35, 36 responsive to the conduction and non-conduction of transistors 100, 101. Similar gating signals are provided from primary winding 150 to the gates of the switching components in the phase B circuit, and primary winding 151 is magnetically coupled to the similar SCR arrangements of the phase C circuit. In that the interconnection and operation of such a logic arrangement is well known and understood in the art, no operating description need be given. To provide those skilled in the art with information to practice the invention with a minimum of experimentation, a table of identification and values of the various components shown in FIGURE 3 is set out at the end of the specification. It is again emphasized that other arrangements, such as that of the logic circuit 12 depicted in Patent No. 3,091,-729—Schmidt, which is assigned to the assignee of this invention, may be utilized in place of this logic circuit, and in the same way the static inverter 14 shown in that patent could also be utilized in place of inverter 16 in the present disclosure. Those skilled in the art will appreciate the interchangeability of such circuit arrangements.

OPERATION OF THE INVENTION

The present invention finds utility in a variety of applications. By way of example, motor 20 of FIGURE 1 can be mechanically coupled to run a grinder, drill or other mechanical implement. After such mechanical interconnection and closure of switch 73 in FIGURE 2, the speed control knob 26 can be adjusted to regulate the frequency of the voltage passed from static inverter 16 to the motor and correspondingly regulate the speed of the driven implement. What distinguishes the present invention over related arrangements in which a knob can be manipulated to adjust speed is that there is no regulation of the amplitude of the voltage passed over conductors 17–19 to the motor as a function of variations in frequency of the A-C voltage passed to the motor. The significance of this difference both in the system design and the attendant savings will now be described in connection with FIGURE 4.

Figure 4:
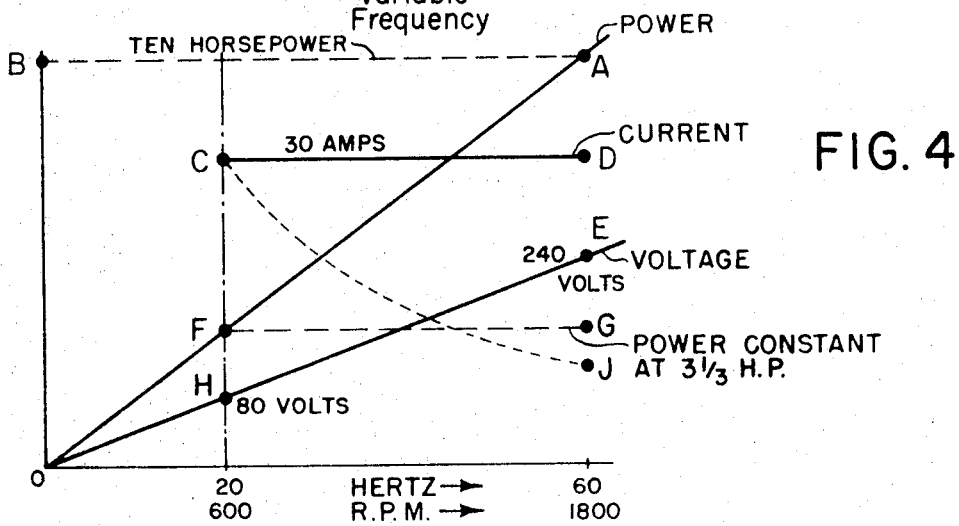
FIGURES 4 and 5 are graphical representations useful in understanding the operation of, and advantages obtained by, the present invention.

In explaining the unobviousness of the present approach to system design by a specific example, a ten horsepower motor will be utilized and reference will be made to FIGURE 4, which depicts the generalized characteristic of a ten horsepower motor when operated in the conventional mode of constant volts-per-cycle. At 1800 r.p.m., with 60 hertz energy applied, the motor develops ten horsepower (point A). As the voltage and the frequency are lowered to reduce the speed as shown by the voltage curve OE, the power available drops linearly (curve OA) as does the voltage. The current required to obtain this available power is essentially a constant as shown (CD), so that at an operating speed of 600 r.p.m. with 20 hertz applied, if the voltage has been reduced to approximately 80 volts (point H), the current when delivering the indicated power of three and one-third horsepower would still be of the order of 30 amperes.

To analyze the situation when the motor is to make available constant power, with the constant volts-per-cycle system of the prior art, reference is again made to FIGURE 4. It is assumed that it is desired to make the constant power available over a 3:1 speed range of from 600 to 1800 r.p.m., but manifestly the system is capable of putting out only three and one-third horsepower over that speed range. The constant volts-per-cycle system has available at the upper end of the speed range considerably more power than will ever be used in this instance. The maximum power that will ever be required is shown to be three and one-third horsepower by the broken line FG. The voltage is assumed to be linear with speed and is shown on the same voltage curve OE. The current required at the low end, 600 r.p.m., would still be 30 amperes as in the previous case. The voltage is now seen to be dropped to 80 volts (H), also as in the previous case. However at the upper end, at 1800 r.p.m., with the voltage increased to 240 volts (E), the current now required is not the 30 amperes only but only the ten amperes (J) shown by the broken line current curve CJ. This hyperbolic current curve results because of the constant power requirement. Basically then, it is seen that the system has a voltage requirement of 240 volts at the upper end, 1800 r.p.m., and a current requirement of 30 amperes at the lower end of the speed range, 600 r.p.m. These two requirements never occur simultaneously in the system, and therefore the system has an inherent capability much greater than the power it is actually required to deliver over the speed range. Thus the system is over-designed by a factor roughly approximating the speed range, 3:1.

Figure 5:
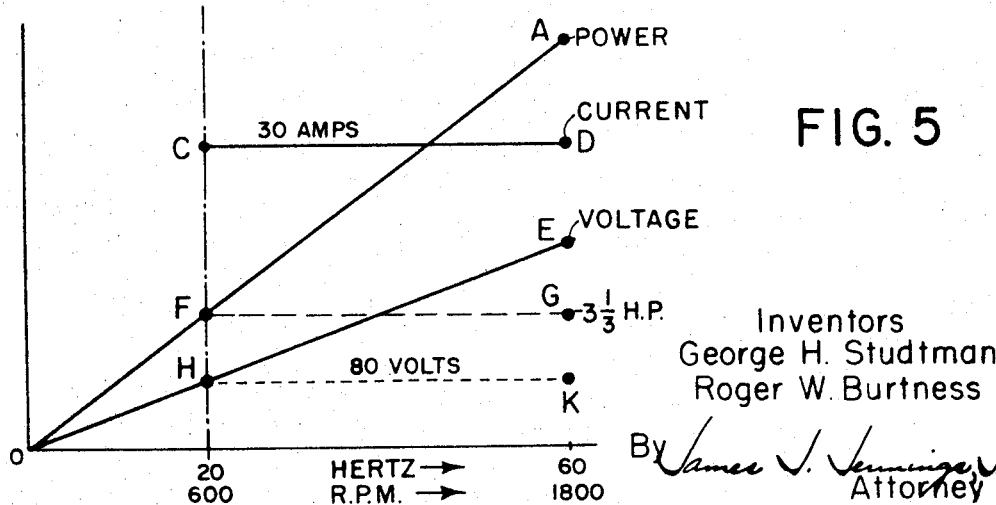

To explain the advantages realized by the inventive system as contrasted to the universally followed constant volts-per-cycle design situation, reference is made to FIGURE 5. In this case it is again assumed that the system requirement is to have three and one-third horsepower available over a 3:1 speed range from 600 to 1800 r.p.m., with essentially the same motor in this system as in the above discussion. In FIGURE 5 the voltage (OE), power (OA), and current (CD) curves are repeated, and the broken line power curve (FG) represents the three and one-third horsepower made available by the present constant voltage system. In accordance with the inventive teaching the voltage is held constant at approximately 80 volts as the frequency is changed, represented by broken line curve HK. In this case the current is still a constant at 30 amperes as shown by the solid curve CD. Thus in the constant voltage, variable frequency system of this invention, the voltage is held constant, the current is essentially constant, and the power is constant. Now however it is seen that the voltage requirement of the system is only 80 volts, as contrasted to the 240 volts previously required. Therefore the system over design has been improved by a factor essentially that of the speed range required. If the example had chosen a wider speed range, say, 10:1, then a similar reduction from the over design condition would have resulted.

Further to explain the over design problem it is helpful to consider the ratings of the various power-handling components in the system proposed. FIGURE 1 shows three power-handling blocks: rectifier system 10 (or some source of power which ultimately becomes D-C), static inverter 16 which converts the D-C to A-C, and the motor 20. The rectifier 10 and the static inverter 16 must be designed to handle the maximum voltage encountered in the system. In the constant volts-per-cycle approach for the constant power application, 240 volts was required. Therefore all the semiconductors must have voltage ratings compatible with this 240 volt level. The current rating required in the constant volts-per-cycle approach was 30 amperes. Therefore 30 ampere, 240 volt devices are required to deliver the constant power in the constant volts-per-cycle approach. In the present constant voltage, variable frequency system the voltage rating of the semiconductors in the rectifier and static inverter are not rated at 240 volts but are rather rated at 80 volts, and a current rating of 30 amperes. Therefore much smaller, and much more economical, devices are usable in a system constructed in accordance with the inventive teaching.

Notwithstanding the long development of this motor control art, it appears that prior of this invention the fundamental problem in the design of all the system components was not appreciated. The inverter and the rectifier are not transformers, that is, they cannot "trade off" the varying voltage and current requirements over the speed range. If 240 volts is required for the motor only at a narrow portion of the speed range, all the components in the static inverter and in the rectifier must still be sized to accommodate this voltage level. By analyzing the rectifier, inverter and motor as a unitary system and appreciating that the load imposed upon the system output shaft does not always require the utilization of a constant volts-per-cycle system, the invention realizes substantial economies and physical reduction of system components in both the static inverter and in the rectifier.

Circuit identification

Solely to assist those skilled in the art to practice the invention by producing a preferred embodiment with a minimum of experimentation, and in no sense by way of limitation on the present invention, a table of typical circuit values is set out below.

FIGURE 2

| Component(s): | Identification or value |
|---|---|
| 35 | MCR1305–6 |
| 36 | MCR1305R–6 |
| 86 | 2N2647 |
| 92 | 2N3642 |
| 94 | C106Y1 |
| 42, 57, 62, 74, 75, 76 | 1N3495 |
| 43, 58, 63, 77, 78, 79 | 1N3495R |
| 46, 48, 51, 52, 87 | D601 |
| 81, 82 | 1N3755 |
| 40, 41 (400 volts) | 4 µf. |
| 54, 67 (500 volts) | 0.05 µf. |
| 50, 53 | 0.025 µf. |
| 83 (15 volts) | 1000 µf. |
| 88 | 25 µf. |
| 85 | 0.2 µf. |
| 26 | 20K |
| 55, 68 (1 watt) | 22 ohms |
| 60, 61, 64, 65 | 15K |
| 84 | 1K |
| 90, 91, 93 | 27 ohms |
| 95 | 1K |

These values were provided for an input voltage of 220 volts, three phase, 60 Hz. energy received over conductors 70, 71 and 72. In addition for the energy return transformer 44 in inverter phase A, each of primary windings 44p1 and 44p2 included 50 turns of #16 wire. Secondary winding 44s included 1100 turns of #30 wire, and the core was a one inch stack of EI–12 laminations. The commutating choke 37 was assembled with a one inch stack of EI–12 laminations, with a total gap of 0.080 inch. Each of windings 37a and 37b included 70 turns of #16 wire. In transformer 45 secondary windings 45a, 45b were of 234 turns each of #32 wire, and they were wound as one center-tapped secondary with 468 turns. Primary winding 45c included 3800 turns of #38 wire, and the core was a one-half inch stack of EI–21 laminations.

FIGURE 3

| Component(s): | Identification or value |
|---|---|
| 100–105 | 2N3638 |
| 106–114 | D601 |
| 115–120 | 0.0033 µf. |
| 121 | 0.033 µf. |
| 122–133 | 5.6K |
| 134–136 | 68 ohms |
| 137–142 | 56K |
| 143 | 6.8M |

While only a particular embodiment of the invention has been described and illustrated, it is apparent that modifications and alterations may be made therein. It is intended to cover all such modifications and alterations as may fall within the true spirit and scope of the invention.

What is claimed is:

1. A speed control system for operating an electric motor over a desired speed range to make available a constant mechanical power output level over this speed range responsive to energization at a constant electrical power input level, comprising:

an input circuit for providing D-C energy at a constant voltage level;

an inverter, coupled between said input circuit and said motor, including components connected to provide A-C energy only at said constant voltage level to energize said motor, and to control the switching cycle of the inverter as a function of received timing signals;

a main rectifier connected to receive A-C input energy at a substantially constant voltage level and to provide D-C energy at the same constant voltage level over said input circuit to the inverter;

a frequency control circuit connected to provide said timing signals and apply said timing signals to said inverter, thus regulating the frequency of the A-C voltage produced by said inverter to regulate the motor speed over said speed range; and an auxiliary rectifier connected to receive A-C input energy, and to pass D-C energy to said frequency control circuit.

2. A speed control system as claimed in claim 1 and further comprising a logic circuit coupled between said frequency control circuit and said inverter, and a delay circuit, coupled between said auxiliary rectifier and said logic circuit, including at least one component connected to complete the energizing path from the auxiliary rectifier to said logic circuit only in response to production of the first of said timing signals by the frequency control circuit.

3. A speed control system for operating an electric motor over a desired speed range to make available a constant mechanical power output level over this speed range responsive to energization at a constant electrical power input level, comprising:

a rectifier circuit connected to receive three-phase A-C energy and including components connected to provide D-C energy at a constant voltage level;

a three-phase inverter coupled between said rectifier circuit and said motor, including components connected to provide A-C energy only at said constant voltage level to energize said motor;

a logic circuit, coupled to said inverter, including components connected to regulate the switching cycle of the inverter as a function of received timing signals;

a frequency control circuit connected to provide said timing signals and apply said timing signals to said logic circuit, thus regulating the operation of the logic circuit and correspondingly regulating the frequency of the A-C voltage produce by said inverter to regulate the motor speed over said speed range; and an auxiliary rectifier circuit connected to receive A-C energy and also connected to provide D-C energy to said frequency control circuit and to said logic circuit.

4. A speed control system as claimed in claim 3 including a delay circuit, coupled between said auxiliary rectifier circuit and said logic circuit, which delay circuit includes components connected to complete the energization path to pass D-C energy from the auxiliary rectifier circuit to said logic circuit only in response to generation of the first of said timing signals in the frequency control circuit.

5. The method of controlling the speed of an electric motor comprising the following steps:

rectifying received three-phase A-C energy to provide D-C energy at a constant voltage level;

inverting the constant level D-C voltage to provide three-phase A-C energy at said constant voltage level;

generating a train of timing pulses;

distributing and applying said timing pulses to regulate the frequency of the constant A-C voltage as a function of the frequency of said timing pulses;

rectifying received A-C energy to provide D-C energy for the generation of the timing pulses and the distribution and application of the timing pulses;

varying the frequency of said timing pulses to effect a corresponding variation of the motor speed;

passing the constant A-C voltage, variable frequency signal to the motor to control motor speed in accordance with the frequency of the timing pulses; and delaying the D-C energization of the pulse distribution and application circuitry until the first of said timing pulses has been provided by the timing pulse generating circuit.

6. A speed control system for energizing and regulating the speed of an electric motor over a desired speed range, comprising:

a rectifier circuit comprising a plurality of passive semiconductor components interconnected in a rectifying arrangement, input conductors coupled to said rectifying arrangement for passing A-C voltage to said components, and output conductors coupled to said rectifying arrangement for providing a D-C voltage at a constant voltage level related to the amplitude of said A-C voltage;

an inverter arrangement, including a pair of semiconductor controllable rectifiers in the inverter with input switching connections for regulating the times of conduction and non-conduction of said controllable rectifiers to produce an A-C voltage at a frequency determined by the times of switching said controllable rectifiers, an inverter input circuit coupled to said output conductors of the rectifier circuit for energization by said constant level D-C voltage, and an inverter output circuit connected to pass said A-C voltage at the same constant amplitude determined by the level of the D-C voltage supplied from said rectifier circuit;

a logic circuit, having an output circuit coupled to said inverter input switching connections to regulate the switching times of said controllable rectifiers in said inverter in accordance with regulating signals passed over the logic output circuit to the inverter, said logic circuit also having an input circuit; and a frequency control circuit including a circuit arrangement interconnected to generate timing signals, variable impedance means for varying the frequency of said timing signals, and an output circuit coupled to said logic input circuit to apply said timing signals to the logic circuit and regulate the frequency of said regulating signals which are passed to the inverter, correspondingly regulating the frequency of the A-C voltage passed from the inverter to the motor.

References Cited

UNITED STATES PATENTS 3,365,638   1/1968   Risberg _____ 318—231 XR
2,784,365   3/1957   Fenemore et al. __ 318—231 XR ORIS L. RADER, Primary Examiner G. Z. RUBINSON, Assistant Examiner U.S. Cl. X.R.

318—231, 432; 321—5